(12) United States Patent
DeRose et al.

(10) Patent No.: US 6,300,960 B1
(45) Date of Patent: *Oct. 9, 2001

(54) REALISTIC SURFACE SIMULATION IN COMPUTER ANIMATION

(75) Inventors: Anthony David DeRose, San Rafael; Michael Kass, Berkeley, both of CA (US)

(73) Assignee: Pixar Animation Studios, Richmond, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,436

(22) Filed: Aug. 4, 1997

(51) Int. Cl.[7] .................................................. G06T 15/70

(52) U.S. Cl. ........................... 345/474; 345/473; 345/430

(58) Field of Search .................................... 345/425, 430, 345/473, 474

(56) References Cited

U.S. PATENT DOCUMENTS 5,452,367 * 9/1995 Bick et al. ............................ 382/128

FOREIGN PATENT DOCUMENTS 0 583 061 A2 * 5/1993 (GB) .............................. G06F/15/72

OTHER PUBLICATIONS

Chen et al (The Virtual Sailor: An implementation of Interactive Human Modeling, IEEE, 0–7803–1363–1/93), 1993.*

Essa et al (Tracking Facial Motions, IEEE, 0–8186–6435–5/94), 1994.*

Singh et al (Control and Coordination of Head, Eyes, and Facial Expressions of Virtual Actors in Virtual Environments, IEEE, 0–7803–1407;7/93), 1993.*

Wu at al (Skin Aging Estimation by Facial Simulation, IEEE, 1087–4844/99, 1999.*

Physical Facial Model Based on 3D–CT Data for facial Image Analysis and Synthesis, IEEE, 0–8186–8344–9/98, 1998.*

The Elastic surface layer model for animated character construction, Turner, R.; Thalman, D.; Communicating with Virtual Worlds, Jan. 1, 1993.*

Kinetix Delivers Breakthrough Character Studio Plug–In for 3D StudioMAX : Businesswire, Jul. 15, 1996.*

* cited by examiner

Primary Examiner—Mark Zimmerman
Assistant Examiner—Mano Padmanabhan
(74) Attorney, Agent, or Firm—Arent Fox Kintner Plotkin & Kahn, PLLC (57) ABSTRACT

Realistic computer generated character animation is achieved by modeling skin or other covering as a separate a quasi-static surface elastically tied to an underlying detailed, articulated model controlled by the animator. The result, automatically incorporates realistic stretching, and sagging, and the combined effect of multiple overlapping animation controls while retaining for the animator frame-by-frame control of a detailed model of the character.

8 Claims, 11 Drawing Sheets

REALISTIC SURFACE SIMULATION IN COMPUTER ANIMATION

CROSS-REFERENCE TO RELATED APPLICATIONS

The following co-pending U.S. Patent applications relate to the present application. Each of the listed co-pending applications is assigned to the same assignee as the present application.

1. U.S. patent application Ser. No. 08/905,434, filed Aug. 4, 1997 and titled: "TEXTURE MAPPING AND OTHER USES OF SCALAR FIELDS ON SUBDIVISION SURFACES IN COMPUTER GRAPHICS AND ANIMATION".
2. U.S. patent application Ser. No. 08/905,435, filed Aug. 4, 1997 and titled: "HYBRID SUBDIVISION IN COMPUTER GRAPHICS".

FIELD OF THE INVENTION

The invention relates generally to the art of computer generated animation. More particularly, the invention relates to the realistic modeling of characters in computer generated animation.

BACKGROUND OF THE INVENTION

To create a three dimensional computer animation, the animator must move three dimensional objects and characters about the scene by specifying the location of all parts of all objects in every frame, or at least in key frames between which motion can be interpolated. In the case of realistic animation in which the individual characters are highly detailed with many attributes, e.g., possible facial expressions, this can be a monumental task. As a first step, the process often begins with a detailed physical model of the character which is then scanned and stored in the computer as a two dimensional array of control points corresponding to vertices of a mesh which approximates the model's bounding surface. The control point mesh contains sufficient information to recreate the model using either B-Spline patches, a polygon mesh, or recursive subdivision surfaces, in sufficient detail to produce a high quality rendered image.

In the traditional "entire kinematic control" approach to computer generated animation, the animator controls the movement of the character by individually specifying the movement of each of the numerous control points. The difficulty is that a highly detailed human head may be represented by 5000 or more control points. The ability to individually manipulate the locations of that many degrees of freedom is both a blessing and a curse. Though it allows the animator to direct the motion, facial expressions, and gestures of the characters in great detail, independently specifying the motion of so many points is an immensely tedious process.

Moreover, because the locations of the control points are independently variable and not tied to together, physical constraints, e.g., that they belong to a semi-rigid body, must be individually enforced by the animator who must for instance insure that control points do not crash into each other or otherwise behave in an unnatural manner which would give rise to unacceptable artifacts in the final rendered scenes.

One may of course drastically reduce the number of degrees of freedom which must be specified and insure that the above described physical constraints are enforced, by treating all or part of the character as a rigid body thereby tying a set of the control points together. One may for instance limit the degrees of freedom necessary to specify the movement of a character's jaw by treating the lower jaw as a rigid body for which the locations of the control points depend only on their initial locations and the angle of rotation of the jaw.

While the constraints of rigid body kinematics greatly lightens the modeling load and works well for the animation of actual rigid bodies, e.g., toys and robots, and as a first approximation for the large scale movements of extremities, it does not result in the realistic animation of people or animals. Animating faces is particularly problematic both because of the many small movements which make up expressive facial gestures and because skin can be both somewhat loose and elastic, so that realistic facial movements are neither localized nor representable in terms of simple rigid body kinematics, e.g., the skin of ajowly character may move little or not at all, much less exactly track the angle of rotation of his jaw.

One commonly used method for more efficiently specifying the motion of sets control points which utilizes some of the simplifications of rigid body kinematics is the use of animation controls to implement elementary physical movements. In this method, described in more detail below in the discussion of the exemplary embodiment, the motion of numerous points is specified in terms of a single control, as in the rigid body case, but the control points affected by the control are not required to move the same amount. Rather, their relative motion is determined by a weight assigned to each point. Though this basically turns a three dimensional problem into a one dimensional one, it nonetheless requires the articulation engineer to perform the still tedious task of specifying hundreds or thousands of individual weights.

Moreover, the character's desired motion will often require the superposition of multiple elementary simultaneous controls. That is, a single point may be subject to, i.e., have non-zero weights corresponding to, several different simultaneous controls. The ultimate motion of the point is then determined to be the sum of the motions required by each control. Unfortunately this result does not always mirror reality, e.g., if a character opens its jaw and wiggles its ear at the same time, the motion of a point on his cheek is not really the sum of the motions of the point under those two acts performed independently.

One ambitious approach to realistically model the behavior of skin and avoid the tedious and difficult point by point kinematic approach is to model skin as a dynamical system driven by underlying skeletal movements. This approach of building a face from the inside out requires solving the equations of motions for the control points as elements of a semi-elastic damped surface subject to a driving force provided by the animator controlled movement of underlying "skeletal" components.

Even if one could model such a complex system in a way which gave realistic results, from the animator's perspective this pure dynamical approach suffers from two related shortcomings. The first problem is that truth does not always equal beauty. Even if one could accurately model the movement of skin resulting from underlying rigid body kinematics and the dynamics of the connective tissue, the result may not have the appearance desired by the animator. Animators creating computer generated animation as artistic works or for commercial entertainment are more interested in the appearance of reality than reality and often times not even the appearance of reality but rather caricature and exaggeration. In any event, animators often do not want to give up the degree of control over the final image required by a purely dynamical approach to modeling skin and facial features. Nor do they want to give up control of the details of the character and rely instead on the manipulation of a skeleton and musculature and some approximation to the intervening biomechanics.

Relatedly, a dynamical approach because it involves solving equations of motion over time, including the effects of momentum, ties the motion of different frames together into a single trajectory. An animator may vary the trajectory by changing the initial conditions and driving force, but cannot directly alter the animation independently on a frame by frame basis. Again this requires that the animator relinquish a large chunk of artistic freedom, this time to Newtonian mechanics. Accordingly, there is a need for a more efficient means of modeling characters in computer animation which retains for the animator the ability to substantially control the detailed appearance and movement of the character.

SUMMARY OF THE INVENTION

The present invention allows the animator to create realistic character animation including skin and facial gestures by manipulating a detailed model of the actual character while at the same incorporating some of the simplifications and constraints of rigid body kinematics, and the ability to localize the motion that must be explicitly specified, to greatly reduce the number of control points whose locations need to be independently determined. The present invention can be viewed as a combination of the entire kinematic approach and the dynamical approach, retaining the animator control of the former with the potential realism of the latter.

In the exemplary embodiment, the skin, fur, or other covering (including clothing), is modeled as an elastic quasi-static surface that is a copy of, and elastically tied to, an underlying objected whose control points are directly controlled by the animator, either individually, or constrained as points on a plurality of interacting rigid bodies. The result automatically incorporates realistic stretching and sagging and the combined effect of multiple overlapping animation controls while retaining for the animator frame-by-frame control of a detailed model of the character.

The present invention is also useful for modeling secondary features of a character, e.g., hands, for which the articulation engineer will not normally create as highly detailed a model as for the face. The use of the invention for modeling the surface of such features provides an efficient means for obtaining realistic results with a sparser (less costly) kinematic model.

DETAILED DESCRIPTION OF AN EXEMPLARY EMBODIMENT

Figure 1:
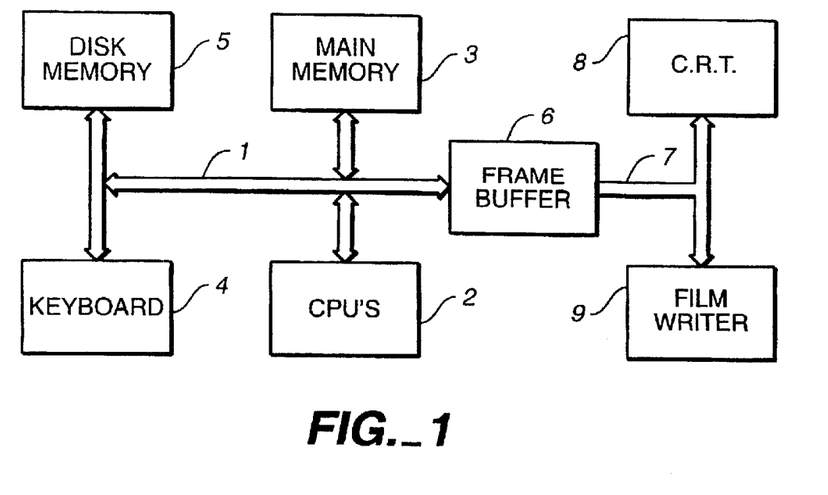
FIG. 1 shows generally the elements of a computer system suitable for carrying out the present invention.

FIG. 1 shows a computer system suitable for carrying out the invention. A main bus 1 is connected to one or more CPU's 2 and a main memory 3. Also connected to the bus are a keyboard 4 and large disk memory 5. The frame buffer 6 receives output information from the main bus and sends it through another bus 7 to either a CRT or another peripheral which writes the image directly onto film. To illustrate the present invention we will describe its use in the animation of a character, Geri. The main steps in that process are summarized in FIG. 2.

Figure 2:
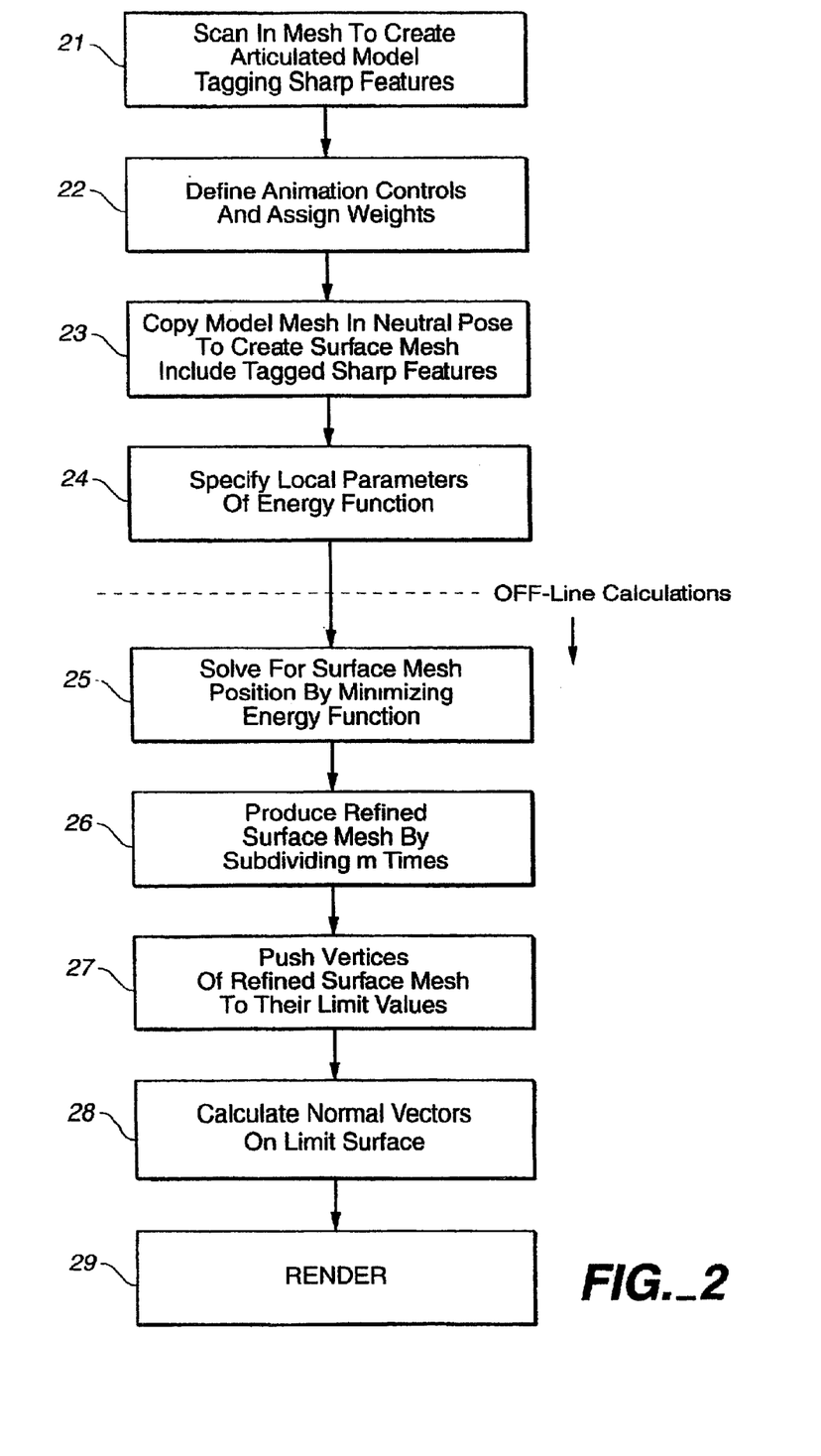
FIG. 2 shows the main steps in generating a computer animation of a character using the techniques of the present invention.

The first step 21 involves the production of a two dimensional control mesh corresponding to a character to be modeled and animated. In the present case, the mesh, shown in FIG. 3, was derived from data scanned in from a physical model of Geri's head. Alternatively, the mesh could be created internally through a CAD program without a physical model. Depending on the type of geometrical primitives to be used, e.g. polygons, NURBS or sub-division surfaces, the set of the control points should be selected so that the chosen primitive representation provides an accurate fit to the original model or design and captures all poses of the character during the animation.

Figure 3:
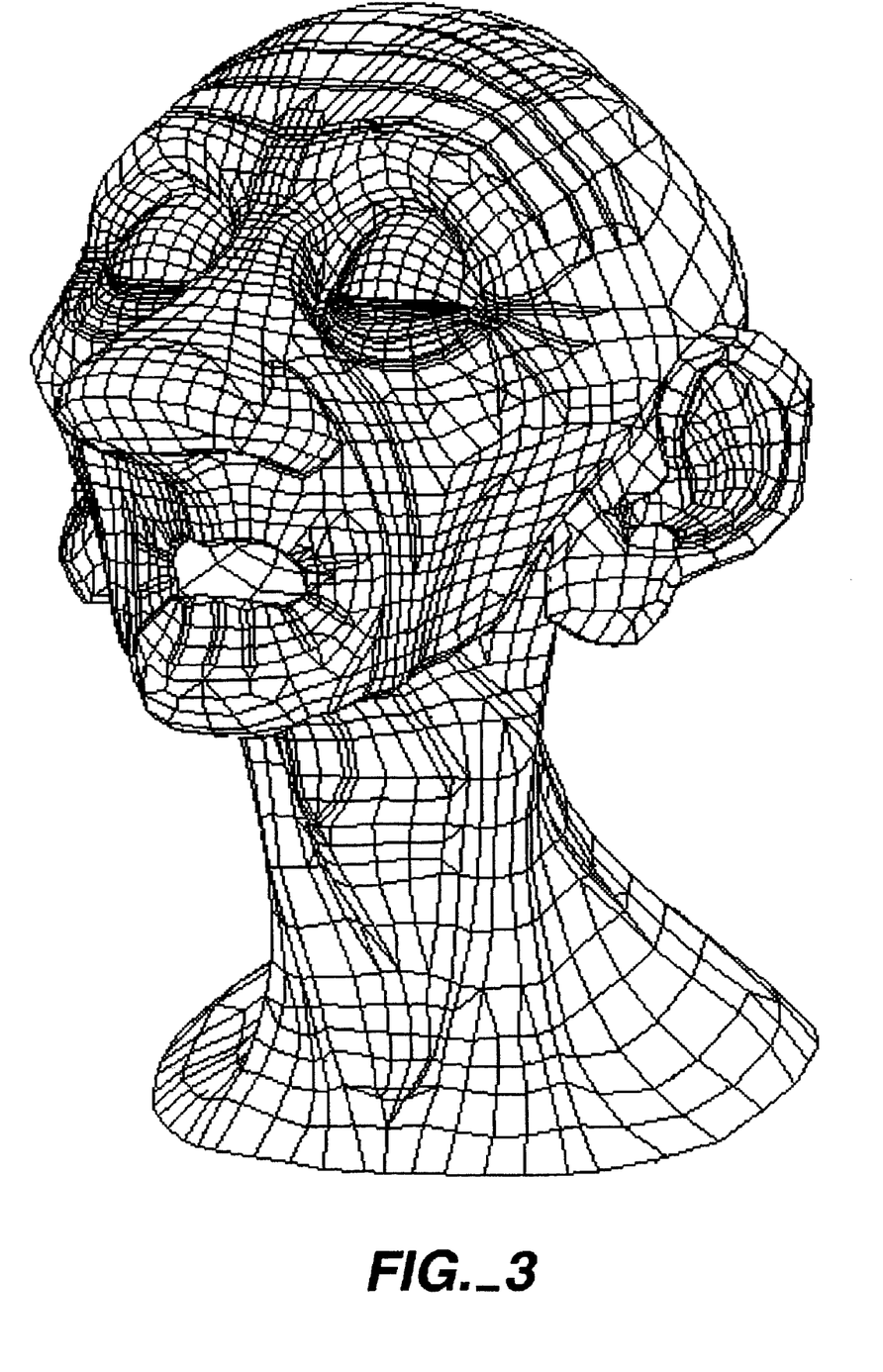
FIG. 3 shows the control point mesh of Geri's head.

In an exemplary embodiment, Geri's head, depicted in FIG. 3, the control mesh contains approximately 4100 control points grouped to form approximately 4300 polygon faces. The points were entered manually using a touch probe on a physical model. Much care was taken in selecting the control points. Regions with fine scale details require more control points, i.e., smaller polygons. In addition, regions with larger polygons—greater spaced control points—should not directly abut regions of small polygons, instead, to prevent artifacts in the rendered image the number and position of control points should be chosen so that transitions between regions of high and low detail (i.e., little and big polygons) are smooth. In addition, one should select the control points so that creases, or other semi-sharp features lie along polygon edges (the treatment of these features will be discussed in detail below). Control points are stored as a list which includes an identifier and the three dimensional coordinates for each point. Points are grouped as polygons and stored in another list with a polygon identifier and the identifiers of the included points. Sharp features are also stored as ordered lists of vertices and sharpness values.

Once the set of control points, polygons and creases defining the kinematic head are entered and stored in the computer, the articulation engineer must determine how each point is to move for each gesture or character movement. This step 22 is done by coding animation controls, which effectuate transformations of the model corresponding to different movements, e.g., jaw down, or left eyebrow up. The transformations may be either linear displacements or, as in the "jaw down" control, rotation about a specified axis. The magnitude of the control, i.e., the amount of displacement or angle of rotation is specified by a scalar parameter, s, supplied by the animator. The corresponding transformation of the model can be written as a function T(s). The possible movements of Geri's face are specified using approximately 252 such controls. The articulation engineer can specify the relative motion of different control points under a given animation control by assigning weights to the control points. In the case of Geri's head, each of the 252 animation controls affects the motion of approximately 150 control points to which non-zero weights are assigned. The effect of the weight is to specify the "strength" of the transformation at the given point, i.e., the transformation T with strength s at a point with weight w is given by T(w*s). The weights for a given control can either be assigned individually, control point by control point, or as a smooth scalar field covering the portion of the mesh whose location is altered by the transformation. The scalar field approach, described in detail in below, offers a great improvement in efficiency over the point-by-point approach which, for 252 controls times an average of 150 weights per control, would require individually specifying almost 40,000 weights to specify the motion of Geri's head alone.

The next step 23 in FIG. 2 is the creation of a second mesh of points, the skin mesh, which will typically be in one-to-one correspondence with the control points of the kinematic head. This need not be the case, however. In some embodiments, a skin mesh is used with a greater number of control points than are contained in the kinematic head and a projection of the skin points to the kinematic head is defined so that each skin point is "tied" to a unique point on the kinematic head (which need not be a control point). Other embodiments may have a skin mesh that is sparser than the underlying kinematic head. In that case, the same projection strategy can be used to tie skin control points to points on the kinematic head.

In the exemplary embodiment of Geri's head, the positions of the skin points were determined by copying the kinematic head control points while Geri's face was in the "neutral pose", which was taken to be the expression on the model head when it was scanned in with the touch probe. The "neutral pose" defines the equilibrium positions of the skin points, i.e., the position of Geri's features for which his skin mesh control points will exactly match the positions of the control points of the kinematic head.

In step 24, the articulation engineer specifies the properties of Geri's skin and the degree to which it is constrained to follow the underlying kinematic head. This is done by specifying the local parameters of an energy function, the extrema of which determine the position of the quasi-static surface, which in the present example is the skin on Geri's head. Though the details of the energy function used to simulate the skin on Geri's head is illustrative, variations are possible and will be readily apparent to those of ordinary skill in the art. The present invention is thus in no way limited to the details of the described implementation. That said, the energy function used to model Geri's head takes the form:

$$E = \sum_{\substack{edge \\ pairs}} E_{s1}(P_i, P_j) + \sum_{\substack{non\text{-}edge \\ pairs}} E_{s2}(P_i, P_j) + \sum_{triplets} E_p(P_i, P_j, P_k) + \sum_{faces} E_d(P_i, P_j, P_k, P_l) + \sum_{points} E_h(P_i)$$

Figure 4:
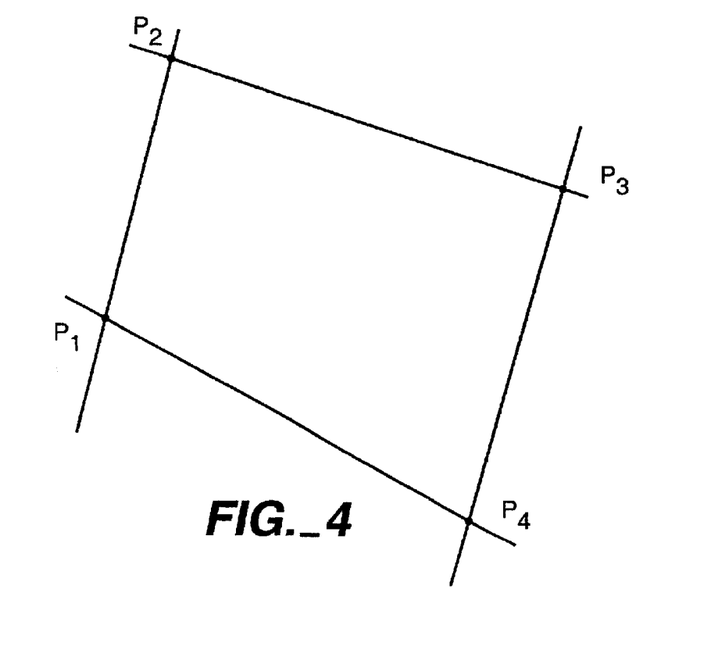
FIG. 4 shows some points on the skin mesh which contribute to the energy function.

The first term accounts for stretching of the skin surface and is given by: $E_{s1}(P_1, P_2) = k_{s1}(|P_1-P_2|-R)^2$ where $P_1$ and $P_2$ as shown in FIG. 4, are the locations (in $R^3$) of two nearest neighbor points connected by an edge of the mesh and R is the distance between the points in the neutral pose. $K_{s1}$ is a spring constant which can either be specified globally or locally for each edge as a combination of scalar field values for the two points, e.g., $K_{s1}(P_1, P_2) = S_1(P_1) + S_1(P_2)$ where $S_1(P_1)$ is a scalar field defined on the mesh by one of the methods described below. The second term includes contributions from nearest neighbor points which are not connected by an edge, e.g., points across a diagonal in a quadrilateral. $E_{s2}(P_1, P_3)$ has the same form as the first term but with a potentially different spring constant $K_{s2}$ which again may be constant through out the mesh or defined locally by a second scalar field, $K_{s2}(P_1, P_3) = S_2(P_1) + S_2(P_3)$. The three point function $E_p(P_1,P_2,P_3) = K_p(|P_3-P_2|/D_1 - (P_2-P_1)/D_2|-R_p)^2$ is included to penalized bending and includes a contribution from each connected triplet of points. $D_1$ is the distance in $R^3$ between $P_3$ and $P_2$ in the neutral pose similarly $D_2$ is the distance between $P_2$ and $P_1$ in the neutral pose. $R_p$ is the value of $|(P_3-P_2)/D_1 - (P_2-P_1)/D_2|$ when all three points are in their neutral pose positions (note that this is not generally zero because $(P_3-P_2)$ and $(P_2-P_1)$ are vectors in $R^3$). The four point function, $E_d(P_1,P_2,P_3,P_4) = K_d E_{s2}(P_1,P_3) E_{s2}(P_2,P_4)$ includes a contribution from each quadrilateral face and is included to penalize skewing. The coefficient $K_d$ may either be a constant throughout the mesh or a combination of scalar field values at the four vertices.

The last term in the energy function penalizes the skin points for straying from their corresponding kinematic mesh points: $E_h(P_s) = K_h|P_s-P_k|^2$ where $P_s$ is a skin mesh point and $P_k$ is its corresponding point in the kinematic mesh. The spring constant $K_h$ is generally given by a scalar field associated with either the dynamic skin mesh or underlying kinematic mesh.

Defining Scalar Fields

Scalar fields were used at several points in the above described process in order to define smoothly varying parameters on either the kinematic mesh or skin mesh. These include the articulation weights which specify the relative movement of kinematic mesh control points under the different animation control transformations, as well as the various spring constants and other locally variable parameters of the energy function. When modeling with subdivision surfaces, the control point mesh is a polygonal mesh of arbitrary topology, on which one cannot define global surface coordinates and on which there is no "natural" or "intrinsic" smooth local parameterization. The absence of a local parameterization has slowed the adoption of subdivision surfaces as a means for modeling objects in computer animation, in part, because it was believed that a surface parametrization was necessary to define scalar fields and perform parametric shading, e.g., texture or surface mapping.

One aspect of the current invention is a solution to this problem and a method for consistently defining scalar fields on subdivision surfaces, including scalar fields which can be used as "pseudo-coordinates" to perform parametric shading. Three exemplary methods for defining smoothly varying scalar fields on arbitrary polygonal meshes which can be consistently mapped through the recursive subdivision process are described below.

Painting

The first method for defining scalar fields is by painting them directly onto the surface mesh. In this technique, an image of a portion of the surface on which the field is to be defined is painted using a standard two-dimensional computer painting program, e.g., Amazon, the intensity of the color applied to the image is chosen to represent the desired magnitude of the scalar field on the corresponding portion of the painted surface, e.g. if one wants the skin of Geri's forehead to more closely follow the movement of his kinematic head than the flesh in his jowls, one would paint his forehead correspondingly darker when "applying" the field giving rise to the parameter $k_h$ in the above described energy function.

The first step in the painting method is to perform a single subdivision of the control point mesh in the region on which one intends to define the scalar field in order to obtain a mesh with only quadrilateral faces, as will always be the case after the first subdivision with Catmull-Clark rules (discussed in detail in the Subdivision section below). The faces in the once subdivided mesh are then numbered and separately coordinatized with two dimensional coordinates u and v assigned to each vertex (thus the need for quadrilateral faces). The surface is then further subdivided one or more additional times so that the resulting mesh sufficiently approximates the smooth surface limit. The u, v, coordinates for each patch (face in the once subdivided mesh) are carried through these additional subdivisions and coordinatize new vertices within the faces of the once subdivided mesh. The image is then rendered and painted with a two dimensional painting program such that the distribution and intensity of the applied color represents the desired local magnitude of the particular scalar field being defined. The painted image is then scanned and patch numbers, u, v, coordinates, and color intensity are stored for each pixel. Each patch is then further subdivided until a dense set of points is obtained within each patch including points with u, v coordinates close to those stored for each pixel in the painted image. The scanned pixel color intensities are then assigned as target scalar field values to the corresponding points in this further subdivided mesh.

Going back to the initial undivided mesh, one then assigns to its vertices initial guesses for the scalar field values which one hopes after several subdivisions will reproduce the target values. The mesh is then subdivided to the level of refinement at which the target values were assigned with scalar field values calculated from the initial guesses using the same subdivision rules used to calculate vertex locations in the refined mesh. The values of the scalar field at the target points resulting from subdividing the mesh with the initial guesses is then compared with the target values at the corresponding points. Differences from the target values are computed and averaged back, reversing the subdivision calculations, to find corrections to the initial guesses for scalar field values at the vertices in the unsubdivided mesh. This comparison and correction process is iterated until convergence. The result is a smooth field that closely approximates the painted intensities defined for any level of subdivision including the smooth surface limit.

Smoothing

Figure 5:
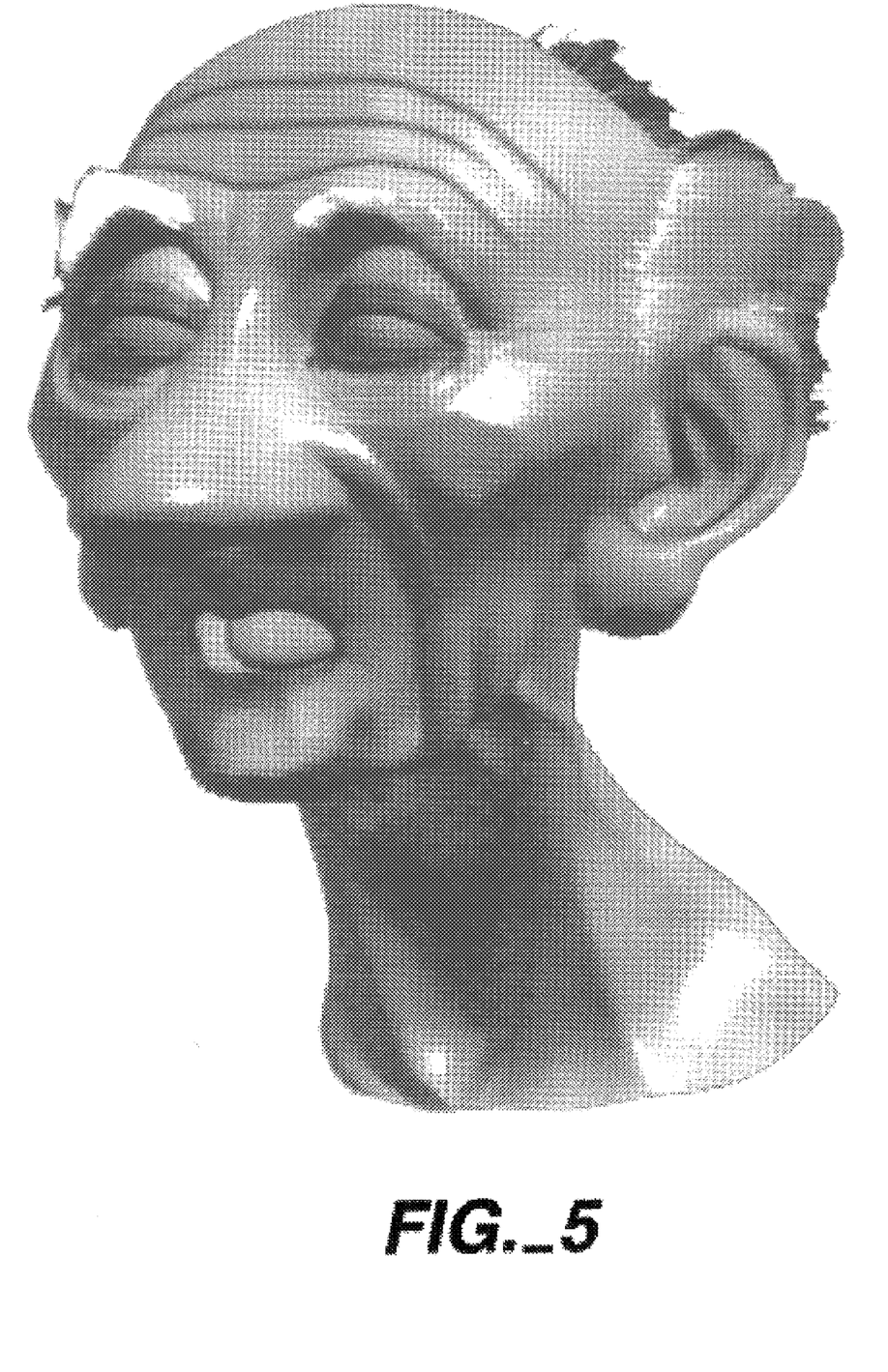
FIG. 5 shows Geri's head with a scalar field for kh in red.
Figure 6:
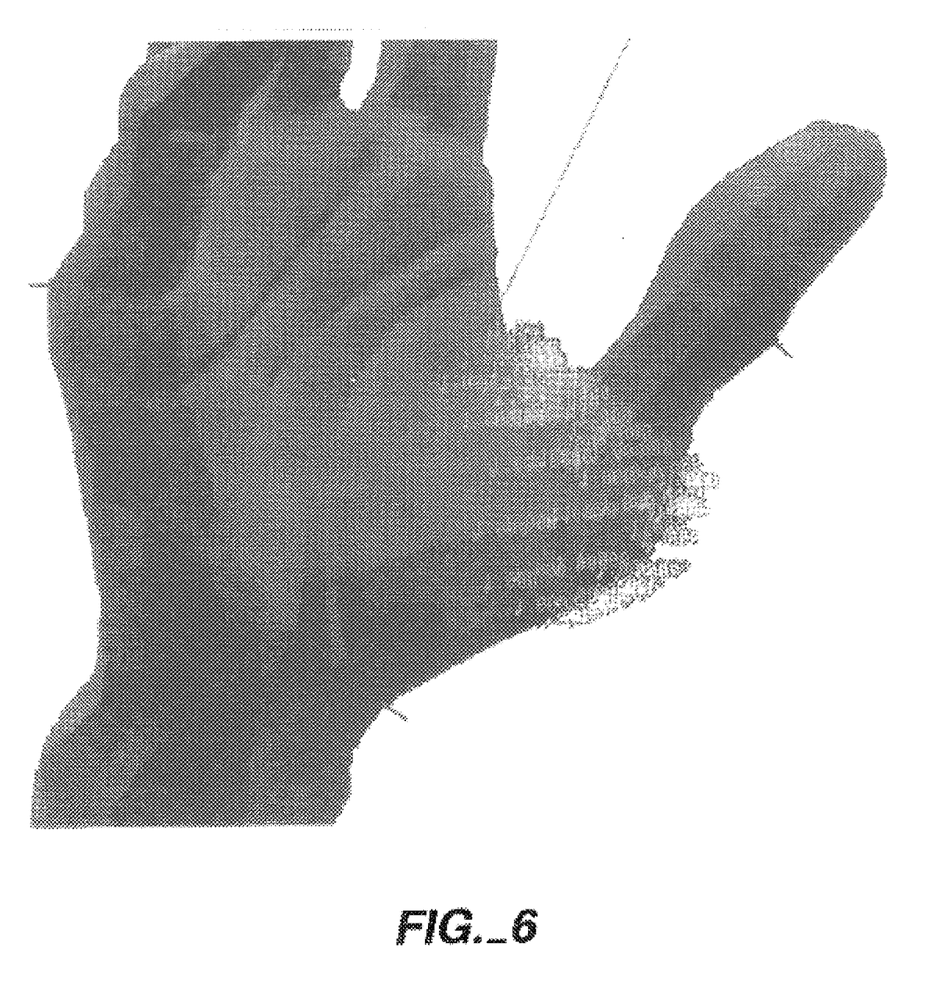
FIG. 6 shows a portion of Geri's hand with articulation weights set to the default value before smoothing.
Figure 7:
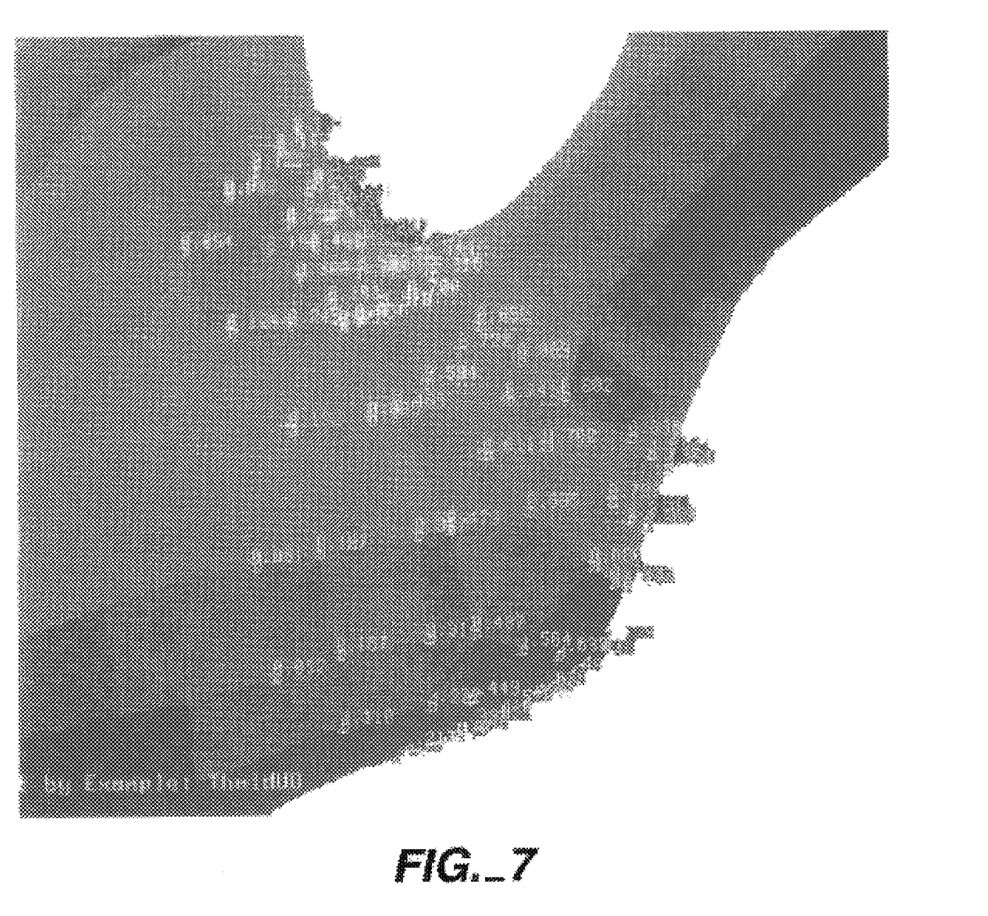
FIG. 7 shows Geri's hand with articulation weights as scalar field values derived by smoothing.
Figure 8:
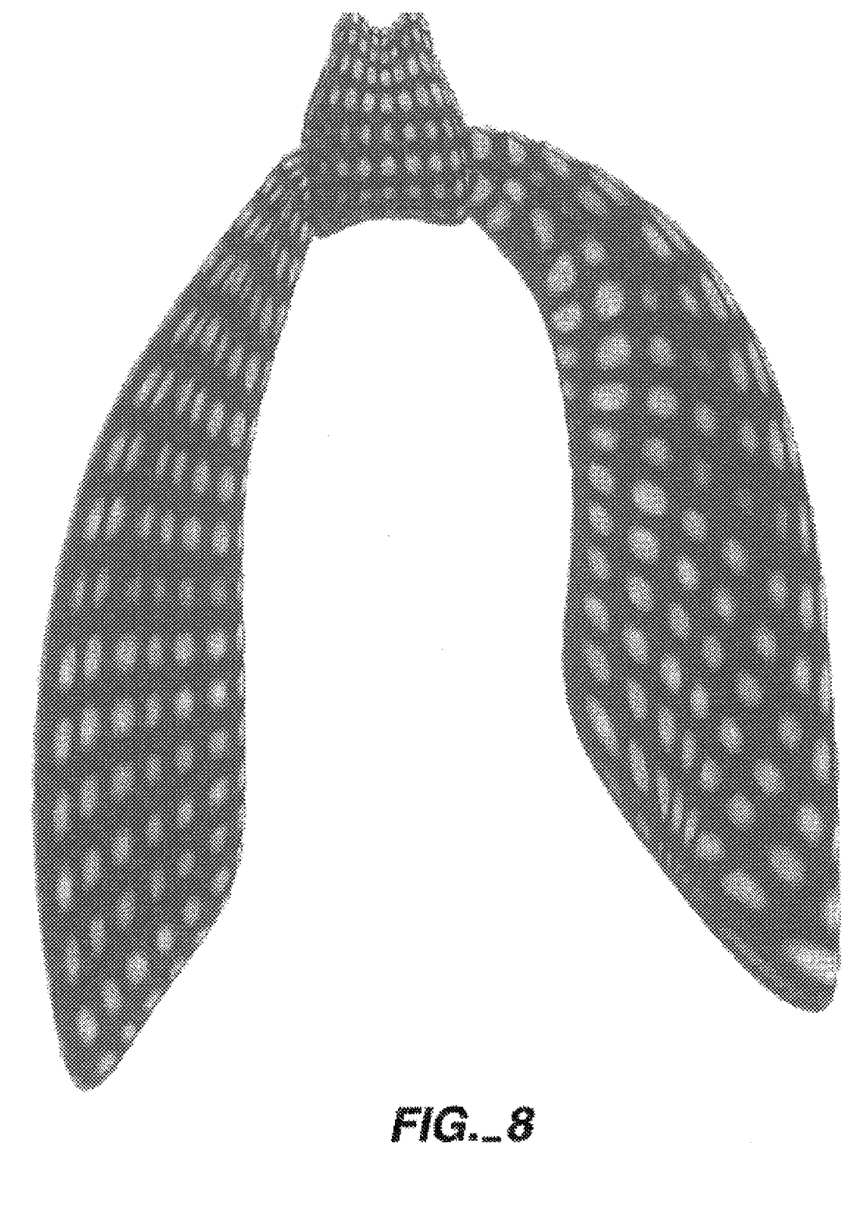
FIG. 8 shows the result of texture mapping on a subdivision surface using the method of the present invention.

The second more direct, if less picturesque, method for defining scalar fields is through smoothing. One begins by specifying values of the desired field explicitly at some boundary or known points in a region of the mesh and solving for the rest through an iterative relaxation approach constraining the scalar field value of the vertices to be equal to the average of their nearest neighbors. FIG. 5 shows Geri's face with the $k_h$ ("glue" field) shown in red. Smoothing was used in applying the $k_h$ field to his chin region. The use of this method to assign smoothly varying articulation weights is illustrated in FIGS. 6 and 7. To assign articulation weights to control points in the transition region between Geri's thumb which will move with full strength, w=1 under the control, and his palm which will not move at all, i.e., have weight O under the control, one begins by enforcing these conditions and, as shown in FIG. 4, by giving the control points in the intermediate region default values of 1. One then performs the iterative relaxation smoothing calculation until one obtains the result shown in FIG. 5., a smooth interpolation of intermediate scalar field values over the control points in the transition region.

Energy Method

Scalar fields can also be used as pseudo coordinates to enable parameteric shading, e.g., texture and surface mapping. One reason that subdivision surfaces have not be more widely adopted for modeling in computer graphics is that the absence of a surface parameterization was thought to prevent the use of texture maps. One can, however, utilizing one aspect of the present invention, define s and t scalar fields ("pseudo-coordinates") on regions of the subdivision surface which can serve as local coordinates for texture mapping. One cannot, of course, trick topology, so these pseudo coordinate fields can only be consistently defined in topologically flat regions of the surface. One can then patch these regions together either discontinuously (e.g., if one wanted two different pieces of cloth to abut along a seem) or continuously (by requiring fields in overlapping regions to have common values). Pseudo- coordinates need only be defined, and consistency requirements need only be enforced after the model has been animated and only in regions in which the texture mapping is to be applied. These static pseudo-coordinate patching constraints are thus far easier to deal with and satisfy than the ubiquitous kinematic constraints required to model complex objects with NURB patches.

Though s and t fields can be defined using either the painting or smoothing method described above, an elaboration of the smoothing method, the energy method, is useful for defining scalar fields to be used as pseudo-coordinates for texture mapping. To avoid unacceptable distortions in the surface texture, the mapping between the surface in $R^3$ and the s and t pseudo-coordinate parameterization of the texture sample in $R^2$ should be at least roughly isometric (i.e. preserve lengths and angles). If one pictures the mapping of the two dimensional texture onto the surface as fitting a rubber sheet over the surface, one wants to minimize the amount of stretching and puckering. If the mapping is onto a portion of the surface with curvature, a pucker free mapping is not possible. A best fit, so to speak, can be achieved, however, by utilizing the first two terms in the energy function described above restricted to two dimensions. Though this technique for achieving a "best fit" approximate isometry is useful for texture mapping onto other curved surfaces, including those defined by NURBS, as will be readily apparent to one of ordinary skill in the art, its implementation will be described in detail for the case of subdivision surfaces.

The aim is to insure that as closely as the geometry allows distances between points measured along the surface embedded in $R^3$ equal distances measured between the same points in the flat two dimensional s and t pseudo-coordinates of the texture patch for all points on the surface to which the texture mapping is to be applied. To achieve a good approximation to this best compromise solution, we begin by subdividing the initial mesh several times in the region to be texture mapped. This provides a fine enough mesh so that the distances between nearest neighbor vertices measured in $R^3$ sufficiently approximate the distance between the same points measured along the surface. One then generally orients the texture on the surface by assigning s and t pseudo coordinates to several control points. One then completes the mapping, finding pseudo-coordinate s and t values for the remaining mesh vertices, by minimizing a two dimensional energy function over the region of the mesh on which the texture is to be applied. An exemplary energy function contains the two point functions from the energy fimction defined above, i.e., $$E = \sum_{\substack{edge \\ pairs}} E_1(P_i, P_j) + \sum_{\substack{non\text{-}edge \\ pairs}} E_2(P_i, P_j)$$

with as before $E_i(P_1,P_2)=k_i(|P_1-P_2|-R)^2$ but now R is the distance between the points as measured along the surface (as approximated by adding distances in three space along the subdivided mesh) and $|P_1-P_2|$ is the two dimensional Euclidean distance between the points's and t pseudo-coordinates, i.e., $\sqrt{(s_1-s_2)^2+(t_1-t_2)^2}$. This energy function can be minimized using Newton's method or other standard numerical technique as described below for minimizing the full energy function to determine the position of skin points.

Off-Line Steps

At this point in the process all of the manual steps in the animation are finished. The remaining steps can all be performed "off-line" as a precursor to the actual rendering of the scene. Because these steps do not require additional input by the animator and take a small fraction of the computation time required for rendering, they add little to the time required for the overall animation project.

Minimizing the Energy Function to Determine the Position of Skin Points

The positions of the control points for the surface mesh are determined by minimizing the energy finction. This can be done iteratively using Newton's method or other standard numerical technique. For each frame of animation, the location of the skin control points can be taken initially to correspond with the positions of the control points of the kinematic mesh. A quadratic approximation to the energy function is then computed and minimized yielding approximate positions for the control points for the surface mesh. These approximate positions are used in the next quadratic approximation which is solved yielding more refined approximate positions. In practice, a few iterations generally suffice.

To drive the system to a definite solution in the situation in which the energy function has a null space, an additional term is added to the energy function for each point in the dynamic mesh which, for the nth iteration, takes the form $\alpha N|P^n_i-P^{n-1}_i|^2$. Where N is the number of successive quadratic approximation iterations performed per frame and $P^n_j$ is the position of the jth control point after n iterations. Though the discussion of the exemplary embodiment to this point has dealt primarily with the quasi-static determination of the surface control point locations, this degeneracy breaking term can be slightly modified to allow for the incorporation of dynamic effects as well, e.g., momentum of the surface mesh. To do so one can replace the above described term with one of the form $E_m=\alpha N|P^n_i-2P^{n-1}_i+P^{n-2}_i|^2$. One can then treat the iteration index as indicating time steps as well and update the underlying kinematic control point positions in steps between frames. The incorporation of momentum in this manner may be useful in some cases, e.g., to automatically incorporate jiggling of fleshy characters.

Subdivision

Once the positions of the skin mesh vertices are determined by iteratively minimizing the energy function, the model can be refined prior to rendering in order to produce a smoother image. One method for refining the mesh is through recursive subdivision following the method of Catmull and Clark. See E. Catmull and J. Clark. Recursively generated B-Spline surfaces on arbitrary topological meshes. *Computer Aided Design*, 10(6):350–355, 1978. One could apply other subdivision algorithms, e.g., Doo and Sabin, see D. Doo and M. Sabin. Behavior of recursive division surfaces near extraordinary points. *Computer Aided Design*, 10(6): 356–360, 1978, or Loop if one chose the initial mesh to be triangular rather than quadrilateral, see Charles T. Loop. Smooth subdivision surfaces based on triangles. M.S. Thesis, Department of Mathematics, University of Utah, August 1987. In the current example Catmull-Clark subdivision was used in part because a quadrilateral mesh better fits the symmetries of the objects being modeled. In the limit of infinite recursion, Catmull-Clark subdivision leads to smooth surfaces which retain the topology of the initial mesh and which are locally equivalent to B-Splines except in the neighborhoods of a finite number of exceptional points at which the initial mesh had a vertex or face with other than 4 edges.

Figure 9:
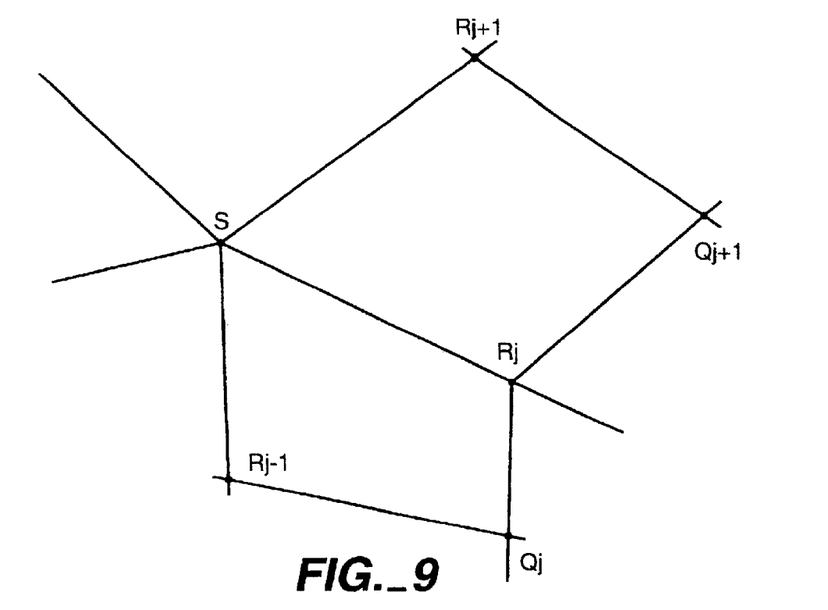
FIG. 9 shows a neighborhood of a point in the control mesh prior to subdivision.
Figure 10:
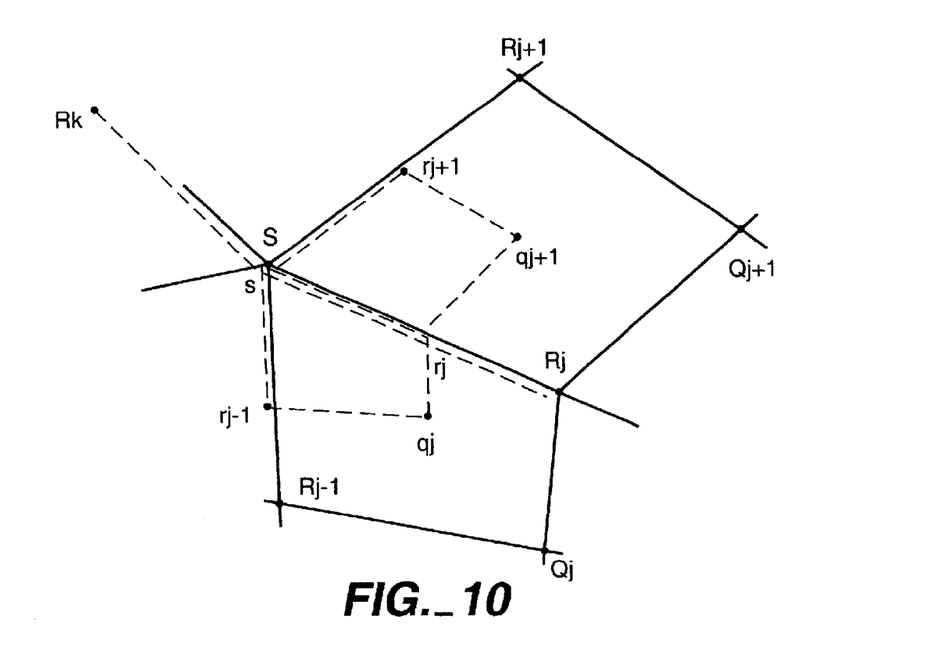
FIG. 10 shows a region of the control mesh with a sharp crease and its subdivision.

The details of constructing smooth surfaces (and approximations to smooth surfaces) through subdivision is now well known in the art and will only be discussed briefly for completeness and as background to the discussion of hybrid subdivision below. FIG. 9 shows a region about a vertex in a quadrilateral mesh. This may be either the initial skin mesh or the mesh resulting from one or more subdivisions. The vertex has n edges. For a "normal point," n=4. If n is not equal to 4, the point is one of a finite number of exceptional points which will exist in any mesh that is not topologically flat. The number of such points will not increase with subdivision. FIG. 10 shows the same region overlaid with the mesh resulting from a single subdivision. The positions of the resulting vertices which can be characterized as either vertex, edge, or face vertices, are linear combinations of the neighboring vertices in the unsubdivided mesh:

$$q_i = \frac{1}{4}(Q_i + R_{i-1} + R_i + S)$$

$$r_i = \frac{1}{4}(q_i + q_{i+1} + R_i + S)$$

$$s = \sum_{i=1}^{n} (q_i + R_i)/n^2 + \frac{(n-2)}{nS}$$

Where j runs from 1 to n, the number of edges leaving the vertex S. Capital letters indicate points in the original mesh and small letters represent points in the next subdivsion. The subdivision process can be written as a linear transformation taking the vector $V=(S,R_1, \ldots ,R_n,Q_1, \ldots ,Q_n)^T$ to the vector $v=(s,r_1, \ldots ,r_n,q_1, \ldots ,q_n)^T$ defined by the 2n+1 by 2n+1 square matrix $M_n$: $v=M_n V$. For Catmull-Clark subdivision about an ordinary point, i.e., when n=4, using the subdivision formulas given above $M_n$ takes the form:

$$M_4 = 1/16 \begin{pmatrix} 9 & \frac{3}{2} & \frac{3}{2} & \frac{3}{2} & \frac{3}{2} & \frac{1}{4} & \frac{1}{4} & \frac{1}{4} & \frac{1}{4} \\ 6 & 6 & 1 & 0 & 1 & 1 & 0 & 0 & 1 \\ 6 & 1 & 6 & 1 & 0 & 1 & 1 & 0 & 0 \\ 6 & 0 & 1 & 6 & 1 & 0 & 1 & 1 & 0 \\ 6 & 1 & 0 & 1 & 6 & 0 & 0 & 1 & 1 \\ 4 & 4 & 4 & 0 & 0 & 4 & 0 & 0 & 0 \\ 4 & 0 & 4 & 4 & 0 & 0 & 4 & 0 & 0 \\ 4 & 0 & 0 & 4 & 4 & 0 & 0 & 4 & 0 \\ 4 & 4 & 0 & 0 & 4 & 0 & 0 & 0 & 4 \end{pmatrix}$$

In practice, the subdivision procedure is applied a finite number of times, depending on the level of detail required of the object which may be specified explicitly or determined automatically as a function of the screen area of the object in a given scene. Typically if one starts with an initial mesh with detail on the order of the control mesh for Geri's head, 4 or 5 subdivisions will suffice to produce quadrilateral faces corresponding to a screen area in the rendered image of a small fraction of a pixel. Iterating the above formulas gives the positions and scalar field values for the vertices in the finer subdivided mesh as a function of the positions and scalar field values of the control mesh.

After a sufficient number of iterations to produce enough vertices and small enough faces for the desired resolution, the vertex points and their scalar field values can be pushed to the infinite iteration smooth surface limit. In the case of Catmull-Clark surfaces, the smooth surface limit is a cubic spline everywhere but in the neighborhoods of the finite number of extraordinary points in the first subdivision of the original mesh. These limit values are easily determined by analyzing the eigenspectrum and eigenvectors of the subdivison matrix, $M_n$. See M. Halstead, M. Kass, and T. DeRose. Efficient, fair interpolation using Catmull-Clark surfaces, *Computer Graphics* (SIGGRAPH 1993 *Proceedings*), volume 27, pages 35–44, August 1993. Specifically, applying the matrix $M_n$ to a vector an infinite number of times projects out the portion of the initial vector along the direction of the dominant right eigenvector of the matrix $M_n$. If we take m=2n+1, the size of the square matrix $M_n$, then we can write the eigenvalues of $M_n$ as $e_1 \geq e_2 \geq \ldots e_m$ with corresponding right eigenvectors $E_1, \ldots, E_m$. We can then uniquely decompose V as $$V = c_1 E_1 + c_2 E_2 + \ldots c_m E_m$$

Where the $c_j$ are three dimensional coordinates and/or values of various scalar fields on the surface but are scalars in the vector space in which $M_n$ acts. Applying $M_n$ we get $M_n V = e_1 c_1 E_1 + e_2 c_2 E_2 + \ldots e_m c_m E_m$. For $(M_n)^\infty V$ to have a nontrivial limit the largest eigenvalue of $M_n$ must equal 1. So that $(M_n)^\infty V = c_1 E_1$. Finally, Affine invariance requires that the rows of $M_n$ sum to 1 which means that $E_1 = (1, \ldots, 1)$. Which gives $s^\infty = c_1$.

If one chooses a basis for the left eigenvectors of $M_n$, $L_1, \ldots L_m$ so that they form an orthonormal set with their right counterparts, i.e., $L_j \cdot E_k = \delta_{jk}$, this projection is given by the dot product $L_1 \cdot V$ where $L_1$ is the left eigenvector of $M_n$ with eigenvalue 1 and V is the column vector defined above of points in the neighborhood of S. For Catmull-Clark subdivision, the value of the this dot product and thus the position of the point s after infinite subdivision is given by $$s^\infty = \frac{1}{n(n+5)}\left(n^2 s + 4\sum_{i=1}^{n} r_i + \sum_{i=1}^{n} q_i\right).$$

This formula gives not only the smooth surface limit value of the position of the vertex points in $R^3$ but can also be used to calculate the smooth surface limit of any scalar fields at those points as a function of their values at points in the neighborhood of S.

Similarly, with a bit more math, see Halstead, et al. cited above, it can be shown that the eigenvectors for the second and third largest eigenvalues of the local subdivision matrix $M_n$ span the tangent space of the limit surface at the point $s^\infty$. One can again project these out of the vector V using the orthonormality property of the left and right eigenvectors giving $c_2 = L_2 \cdot V$ and $c_3 = L_3 \cdot V$. Because $c_2$ and $c_3$ span the tangent space at the point $s^\infty$, their cross product gives a vector normal to the limit surface at that point, i.e., $N^\infty = C_2 \times c_3$ at the point $s^\infty$. These tangent vectors have been calculated for Catmull-Clark subdivision and are given by:

$$c_2 = \sum_{i=1}^{n} A_n \cos(2\pi i/n) r_i + (\cos(2\pi i/n) + \cos(2\pi(i+1)/n)) q_i$$

Where $A_n = 1 + \cos(2\pi/n) + \cos(\pi/n)\sqrt{2(9 + \cos(2\pi/n))}$
and $c_3$ is obtained by replacing $r_i$ with $r_{i+1}$ and $q_i$ with $q_{i+1}$.

After constructing $N^\infty$, the smooth surface limit normal, at each of the vertices of the refined mesh. One can then interpolate these normals across the subpixel faces of the refined mesh to render the character using Phong shading.

Hybrid Subdivision Schemes

One aspect of the present invention is a method for creating surfaces by sequentially combining different subdivision rules. By subdividing a mesh a finite number of times with one or more sets of "special rules" before taking the infinite subdivision limit with the "standard rules", one can produce different limit surfaces from the same initial mesh. Combining different subdivision rules thus provides an additional degree of freedom which can be a more efficient means for obtaining the desired limit surface than adding points to the initial mesh. Below we describe in detail two particular exemplary uses of this aspect of the invention in modeling Geri. Many others will be readily apparent to those of ordinary skill in the art.

Semi-Sharp Edges and Creases

Human skin is not a completely smooth surface. Faces and hands, for example, contain somewhat sharp features, both creases and edges. To model these features using the general smooth-surface-limit subdivision techniques outlined above, or more conventional B- spline patch methods, would require a very complicated initial control mesh in which the vertex spacing in regions of sharp features would have to be very small, leading to lots of points and quadrilaterals. One method for modeling sharp features with subdivision surfaces without adding substantially to the complexity of the initial control mesh is to alter the subdivision rules for points lying on corners or sharp edges or creases. As described above, these features can be incorporated and tagged in the initial control mesh.

The sharpness of these features can be maintained throughout the otherwise smoothing subdivision process by decoupling the subdivision process along sharp edges so that points on either side of the sharp feature do not contribute to the position of points on the edge in subsequent subdivisions. Locally modifying the subdivision algorithm in this way results in a limit surface with sharp edges or creases across which the tangent plane is discontinuous. Details of this method for modeling various sharp features using Loop subdivision on a triangular mesh can be found in Hoppe, et al. Piecewise smooth surface reconstruction. *Computer Graphics* (SIGGRAPH '94 *Proceedings*) (1994) 295–302.

The problem with using the Hoppe, et al. approach for the realistic animation of characters is that skin surfaces do not have infinitely sharp edges. All real objects, including humans, have some finite radius of curvature along their otherwise sharp features. This fact may be ignored when rendering machined metal objects but is very apparent when modeling and rendering human faces. The exemplary embodiment includes a modification of the above described subdivision algorithm to allow the modeling and rendering of edges and creases of arbitrary and continuously variable sharpness.

Figure 11:
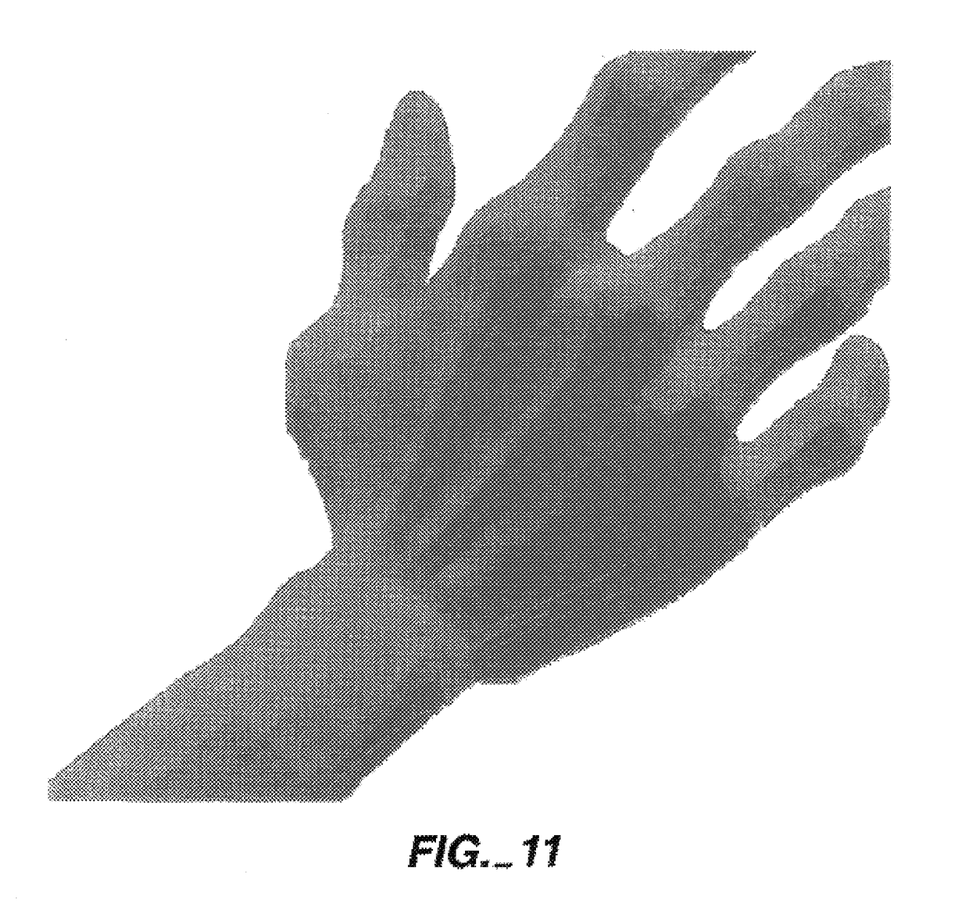
FIG. 11 shows the control mesh of Geri's hand with sharpness 1 features highlighted.
Figure 12:
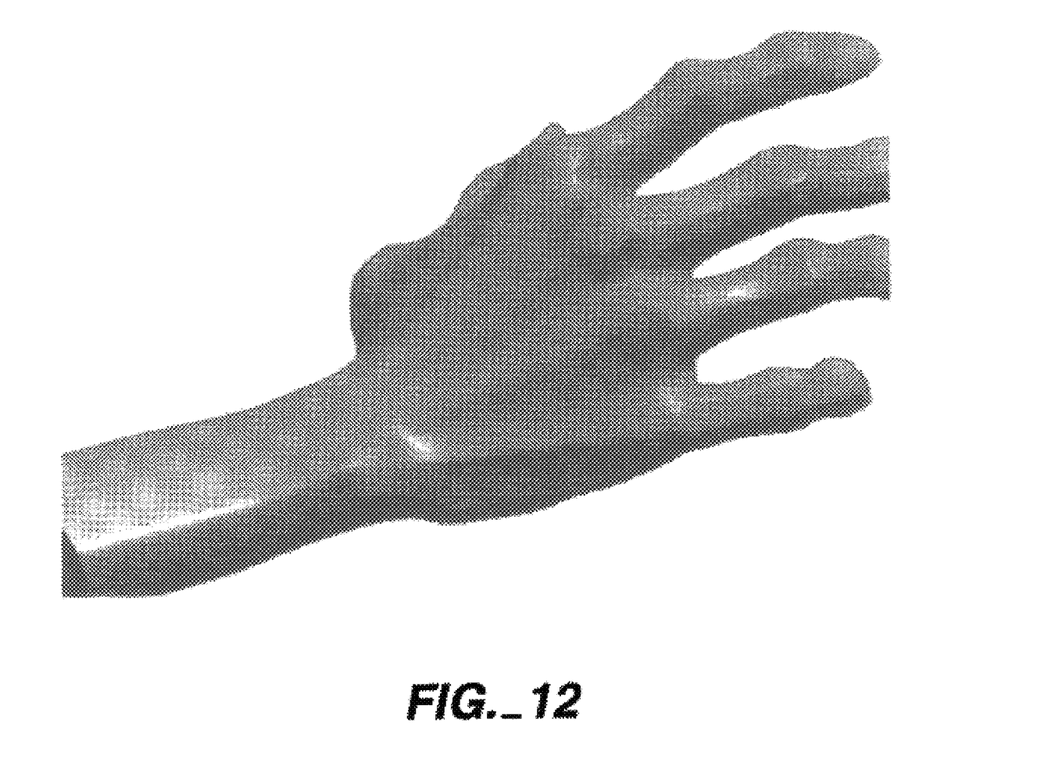
FIG. 12 shows the resulting semi-sharp features in a rendered image.

FIG. 11 shows a portion of the initial control mesh of Geri's hand with sharp features highlighted. As described above, care was taken in the initial choice of mesh vertices so that these sharp features lay along edges of the initial mesh. Their position in the mesh was stored along with a sharpness value between 0 and 5 (assuming 5 explicit subdivisions was the maximum performed before pushing the vertices to their limits). Because the skin mesh has the same topology as the control mesh, the corresponding edge in the skin mesh is uniquely identified. To model an edge or crease with sharpness N where N is an integer, one applies the sharp edge subdivision technique described in Hoppe et al. to determine the locations of points along the designated edge or crease for the first N subdivisions. Thus to determine new edge and vertex locations along the crease or edge instead of applying the standard Catmull-Clark formulas described above, one uses for example the following sharp edge formulas:

$$r_i = \tfrac{1}{2} R_i + \tfrac{1}{2} S$$

$$s = \tfrac{1}{8} R_j + \tfrac{1}{8} R_k + \tfrac{3}{4} S$$

where $R_j$ and $R_k$ are the points on either side of S along the sharp edge or crease, as shown in FIG. 10. If S is a vertex at which a crease or edge ceases to be sharp its position after subdivision is calculated using the normal Catmull-Clark formulas.

After N subdivisions one applies the normal smooth algorithm for subsequent explicit subdivisions and then pushes the points to their smooth surface limits. Thus for sharpness 2 features, one applies the sharp formulas for the first two subdivisions and then uses the smooth formulas for subsequent subdivision and for taking the smooth surface limit. One can get "fractional sharpness" e.g., 1.5, by linearly interpolating edge point locations between the sharpness 1 and 2 results, i.e., calculate the position of control points after performing one sharp and one smooth subdivision and calculate the position of control points after subdividing twice with the sharp subdivision rules and take the average of the two locations before subdividing farther with the smooth rules or pushing the points to their smooth surface limits.

One can also determine the positions and tangents on the limit surface of points in the initial mesh on a semisharp feature without explicitly iterating the semisharp rules, by analyzing the eigenstructure of the combined transformation matrix in a manner similar to that described above for the case of smooth subdivision. The limit surface position for the neighborhood of a semisharp feature of sharpness k is given by $v^\infty = (M_{smooth})^\infty (M_{sharp})^k V$ where we have suppressed the n index indicating the number of edges and added a subscript designating smooth and sharp transformations. As above for the smooth case, we can replace the application of $M_{smooth}$ an infinite number or times with dotting by $L_1$ its dominant left eigenvector, giving $v^\infty = L_1 \cdot (M_{sharp})^k V$. We can then replace $L_1$ by its decomposition in terms of left eigenvectors of $M_{sharp}$. $L_1 = t_1 l_1 + t_2 l_2 + \ldots t_m l_m$ where $l_i$ are left eigenvectors of $M_{sharp}$ and $t_j$ are expansion coefficients, scalars under $M_{sharp}$. Applying $M_{sharp}$ k times from the right to this expansion, we get: $v^\infty = (t_1 \lambda_1^k l_1 + \ldots t_m \lambda_m^k l_m)$ where the $\lambda_j$ are the eigenvalues of $M_{sharp}$.

One may also create a feature with varying sharpness along its length. Assuming again that the initial mesh is created so that the sharp feature lies along one or more connected edges, one can specify sharpness values at the vertices of the feature either by hand or by one of the scalar field techniques described above, limited to one dimension. One can calculate the limit values of the sharpness field treating the sharp feature as a subdivision curve and taking its limit value using the dominant left eigenvector as described above for two dimensional surface subdivision. For uniform cubic B-Spline subdivision along a curve, that vector is given by $\mu_1 = \tfrac{1}{6}[1,4,1]$. See, e.g, E. Stollnitz, T. DeRose and D. Salesin. *Wavelets for Computer Graphics*, 1996, 61–72. The limit value of the field on a point along the semi-sharp feature is thus given by ⅔ of its value plus one ⅙ of the value of each of its nearest neighbors.

The location of each vertex point on the semisharp feature is then calculated using the limit value of its sharpness field, i.e., one applies the sharp rules in the neighborhood of that point the number of times specified by the point's sharpness value (including interpolation, as described above for non-integer sharpness values).

This continuous smoothing of sharp edges can be used in conjunction with other subdivision schemes as well including those proposed by Loop and Doo and Sabin, cited above. In particular, all of the sharp edge techniques and results of Hoppe, et al. can be extended to allow for the efficient modeling of semi-sharp features by combining smooth and sharp subdivision rules in the manner described above for Catmull-Clark subdivision.

Improving The Surface In the Neighborhood of Triangular Faces

Figure 13:
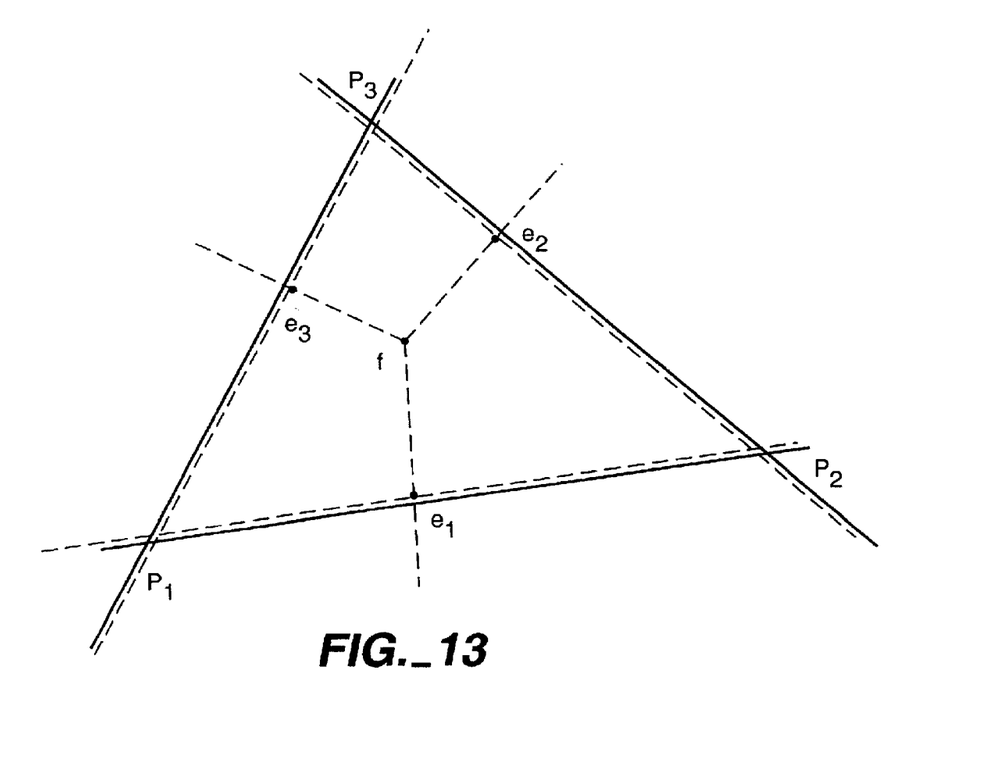
FIG. 13 shows a triangular face in the initial mesh and its first subdivision.

A second application of hybrid subdivision used in the exemplary embodiment involves a modification to the standard Catmull-Clark rules used to determine the location of face points in the first subdivision of a triangular face. As described above, if one begins with an arbitrary polygon mesh which includes non-quadrilateral faces, after one subdivision with Catmull-Clark rules, all faces in the refined mesh will be quadrilateral (though some vertices will have more than four edges). If one has an initial mesh which is convex with some triangular faces, e.g., the initial control point mesh of Geri's head, the smooth surface resulting from standard Catmull-Clark subdivision will be somewhat "lumpy" in regions in which there were triangular faces in the original mesh. The shape of the limit surface can be improved if when calculating the location of the face point for a triangular face in the first subdivision (the only time there will be triangular faces), one takes its location to be the average of the locations of its surrounding edge points after subdivision rather than the average of the its surrounding vertices in the undivided mesh, the standard Catmull-Clark rule. This is illustrated in FIG. 13. The solid lines and points $P_i$ are points in the initial mesh. The dashed lines show the once subdivided mesh with points $e_i$ and $f$. Under normal Catmull-Clark rules the location of $f$ is given by: $f = \tfrac{1}{3}(P_1 +$ $P_2+P_3$). Instead, we take $f=\frac{1}{3}(e_1+e_2+e_3)$. Because the $e_i$ depend the locations of neighboring faces as well as the $P_i$, $f$ will be drawn closer to the center of a convex mesh and the limit surface will have a smoother contour.

The specific arrangements and methods described herein are merely illustrative of the principles of the present invention. Numerous modifications in form and detail may be made by those of ordinary skill in the art without departing from the scope of the present invention. Although this invention has been shown in relation to particular embodiments, it should not be considered so limited. Rather, the present invention is limited only by the scope of the appended claims.

What is claimed is:

1. A method for enhancing the appearance of characters in computer animation comprising the steps of:
    a. constructing an articulated model in the form of a kinematic mesh corresponding to the character to be animated, said articulated model being locally and directly controllable by an animator on a per-frame basis;
    b. constructing a quasi-static surface mesh corresponding to, and distinct from, said kinematic mesh;
    c. coupling points of said surface mesh with points of said kinematic mesh to provide for movement of said surface mesh responsive to movement of said kinematic mesh, wherein the animator maintains local and direct control of said surface mesh on a per-frame basis through manipulation of said kinematic mesh coupled with said surface mesh.

2. The method of claim 1 wherein the position of said quasi-static surface corresponds to that of said articulated model for a particular configuration of said articulated model.

3. The method of claim 1 wherein said quasi-static surface is elastically coupled to said articulated model.

4. The method of claim 3 wherein the strength of said elastic coupling can be locally varied throughout said articulated model.

5. The method of claim 1 wherein the position of the quasi-static surface depends on one or more internal parameters of the quasi-static surface.

6. The method of claim 5 wherein said one or more internal parameters include the flexibility of the surface.

7. The method of claim 5 wherein said one or more internal parameters include the elasticity of the surface.

8. The method of claim 1 wherein the position of said quasi-static surface is determined by the extrema of an energy function.

* * * * *